United States Patent [19]

Albrecht

[11] Patent Number: 4,795,060

[45] Date of Patent: Jan. 3, 1989

[54] DEVICE FOR THE METERED DISPENSATION AND REGISTRATION OF LIQUIDS

[76] Inventor: Peter Albrecht, Klosterweg 5, D-3300 Braunschweig, Fed. Rep. of Germany

[21] Appl. No.: 839,266

[22] Filed: Mar. 13, 1986

[30] Foreign Application Priority Data

Mar. 14, 1985 [DE] Fed. Rep. of Germany ....... 3509189

[51] Int. Cl.[4] .............................................. B67D 5/30
[52] U.S. Cl. ........................................ 222/17; 222/59; 222/148; 222/504
[58] Field of Search ...................... 222/59, 52, 40, 60, 222/504, 148, 20, 17, 14, 21, 129.1, 640, 641

[56] References Cited

U.S. PATENT DOCUMENTS

| 2,704,171 | 3/1955  | Cole .................................. 222/148 |
| 3,666,144 | 5/1972  | Winder ............................... 222/504 |
| 3,802,606 | 4/1974  | Gust .................................. 222/504 |
| 4,001,801 | 1/1977  | Moulet ............................... 222/59 |
| 4,057,173 | 11/1977 | Tal .................................... 222/59 |
| 4,478,357 | 10/1984 | Jenkins ............................. 222/129.1 |
| 4,598,843 | 7/1986  | Ozdemil ............................. 222/504 |
| 4,648,154 | 3/1987  | Meinen ............................... 222/14 |
| 4,651,907 | 9/1987  | Thomas ............................. 222/504 |

FOREIGN PATENT DOCUMENTS

2548442 5/1977 Fed. Rep. of Germany .

Primary Examiner—Michael S. Huppert
Assistant Examiner—Kenneth Noland
Attorney, Agent, or Firm—Foley & Lardner, Schwartz, Jeffery, Schwaab, Mack, Blumenthal & Evans

[57] ABSTRACT

A device for the metered dispensation and registration of liquids dispensed from a bottle, comprising a solenoid valve which is attached to the bottle neck, and which is opened and closed magnetically, with the closed position being the rest position of the solenoid valve. The housing of the solenoid valve is provided with coding marks. In addition to the solenoid valve arrangement, the device includes an operating head having a receiving opening for the bottle neck with the solenoid valve, an operating coil for the solenoid valve, a reading facility for the coding marks. A flowmeter which controls the opening time of the operating coil, is positioned downstream of the operating coil. The device further includes a stationary registration facility which is connected to the operating head. The device permits the viscosity-independent metering of all possible drinks if the operating head is fixedly-installed with its receiving opening upwardly positioned and the flowmeter functioning to control the opening valve via the operating coil.

9 Claims, 1 Drawing Sheet

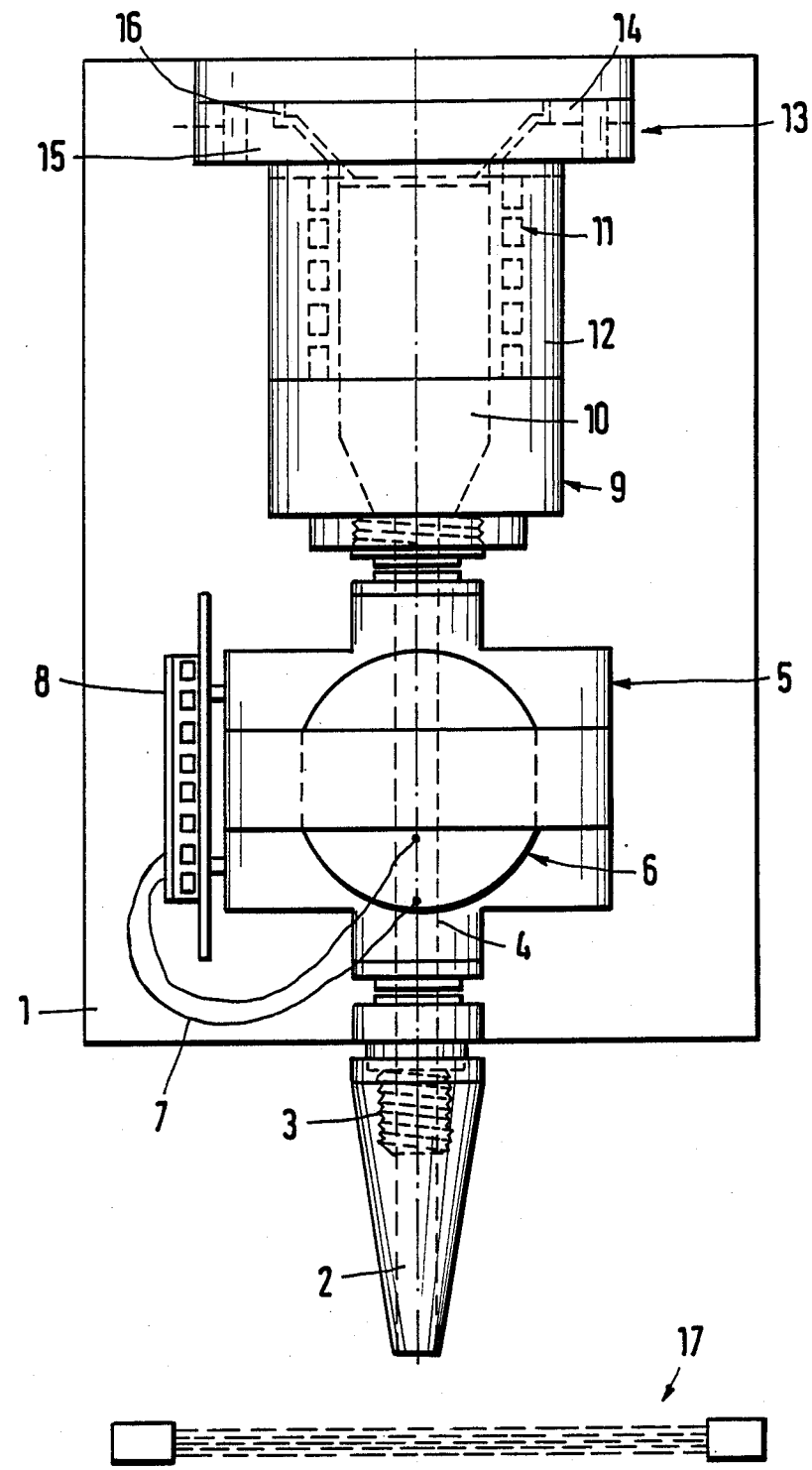

DEVICE FOR THE METERED DISPENSATION AND REGISTRATION OF LIQUIDS

BACKGROUND OF THE INVENTION

The present invention relates to a device for the metered dispensation and registration of liquids dispensed from a bottle. The device includes a solenoid valve which is attached to the bottle neck. The solenoid valve is opened and closed magnetically, with the closed position being the rest position of the valve. The housing of the solenoid valve is provided with coding marks. The inventive device further includes an operating head having a receiving opening for the bottle neck with the solenoid valve, an operating coil for the solenoid valve and a reading facility for the coding marks. In addition, a stationary registration facility is provided, which is connected to the operating head.

A device of this type is described in German Offenlegungsschrift No. 2,548,442. In this case, a solenoid valve is inserted into the bottle neck. The housing of the solenoid valve protrudes from the bottle neck and is provided with coding marks on the outside of the housing portion protruding from the bottle neck. An operating head can be pushed onto the bottle neck. The operating head is connected, with the aid of a flexible cable, to a stationary registration facility. The bottle with the fitted operating head can then be handled normally, i.e., emptying is performed by standing the bottle on its head, with the emptying being controlled by the operating coil opening the solenoid valve for a certain time period. The opening time of the solenoid valve is correlated in the registration facility with a quantity of dispensed liquid, the type or price of which is recognized by the registration facility based upon the coding marks read.

The known device assumes that the dispensation of drinks is to be possible in various places. The connection of the operating head to the stationary registration facility means, however, that only very limited room for movement is available. The known device is only suitable for highly fluid substances which are dispensed in what are, with respect to magnitude, the same (small) quantities. The opening of the solenoid valve for a predetermined time does not permit the different viscosities of different drinks to be taken into account. Since several drinks are usually combined in one price group, and these drinks therefore receive the same coding, a differentiation according to viscosities cannot be implemented in practice. In the case of the known devices, considerable variations in the quantity of liquid dispensed, therefore, have to be accepted. A further disadvantage of the known devices is that the operating heads effecting the opening of the solenoid valves are held in the hand and, during the enclosure of their housing by the hand can be manipulated by means of magnets. In this way, drinks can be dispensed without being registered because the opening signal for the registration facility is not triggered.

Also, inexpensively producible and purely mechanically acting metering facilities are known which can be fitted into the respective bottle neck as a closure. The facilities remain connected to the bottle for the duration of the emptying process. A registration of the quantities of liquid dispensed is not provided for in this case.

SUMMARY OF THE INVENTION

It is therefore an object of the present invention to provide a device for dispensation and registration of liquids from a bottle which permits an exact metering of liquids, even with different viscosities.

Another object of the invention is to provide a device of the type above which is suitable for the dispensation of all drink liquids.

In accomplishing these objects, there has been provided in accordance with the present invention, a device for the metered dispensation and registration of liquids from a bottle, comprising (a) a solenoid valve attachable to the neck of a bottle and magnetically operable between an opened position and a closed, rest position, the valve comprising a housing which includes coded information, (b) a fixedly-installed operating head which comprises a (i) receiving part which includes a receiving opening extending substantially vertically for receiving the bottle with the solenoid valve, a coil about the receiving opening for operating the solenoid valve, and a reading facility for reading the coded information, and (ii) a flowmeter connected to the receiving part and downstream of the operating coil for controlling the opening time of the operating coil, and (iii) a liquid channel extending longitudinally through the receiving part and the flowmeter, and (c) a stationary registration facility connected to the operating head.

Additionally, the device includes an injection gap in the receiving part for injecting a predetermined quantity of fluid into the liquid channel after metering. Preferably, the injection gap conically narrows axially in the flow direction and opens annularly at the peripheral walls of the liquid channel.

In a further embodiment, the device comprises a sensor positioned beneath the operating head and operatively connected to the operating coil.

Further objects, features and advantages of the present invention will become apparent from the detailed description of preferred embodiments which follows, when considered with the attached figure of drawing.

BRIEF DESCRIPTION OF THE DRAWING

In the drawing:
FIG. 1 illustrates the operating head of the present invention.

DETAILED DESCRIPTION OF PREFERRED EMBODIMENTS

The present invention achieves the above objects as the result of a device of the type mentioned earlier in the disclosure in which the operating head is fixedly installed with its receiving opening extending upwardly. Additionally, the operating head has a flowmeter downstream of the operating coil, which controls the opening time of the coil.

The device according to the present invention involves a departure from the basic idea that the operating head should be able to be fitted onto the bottle so that the overall arrangement of bottle, solenoid valve and operating head is able to be handled in a mobile manner. According to the present invention, the operating head is fixedly installed and has an upwardly-directed receiving opening for the bottle which is closed by the solenoid valve. According to the invention, the operating head is provided with a flowmeter which controls the opening time of the solenoid valve.

The arrangement according to the present invention has a multiplicity of advantages. Because the control of the operating coil is performed by the flowmeter, a desired quantity is metered correctly, independent of the viscosity of the liquid. In the stationary arrangement of the operating head, the operating coil may be much larger and sturdier than the operating coil in the previously known magnetic head which could be moved with the bottle. Consequently, the operating coil can also open a bottle in difficult cases, for example, in the case of drinks having a high viscosity, which easily cause sticking of the solenoid valve. The operating head according to the present invention also permits iced drinks to be dispensed.

Furthermore, on account of the control of the operating coil by the flowmeter, it is possible to provide a very large outflow cross-section, so that even relatively large quantities, for example, for long drinks, may be dispensed within a short time. Previously, the typical control of the opening time of the solenoid valve would have resulted in excessive metering errors with a large outflow cross-section, so that previously only small outflow cross-sections could be used. The small outflow cross-sections did not, however, permit the dispensing of, for example, 0.2 l of wine within an economically viable time, and thus the known devices were not usable for such applications.

Due to its fixed installation, the operating head according to the present invention may be constructed as large as desired. Therefore, it is easy to produce the effect that a switch, which effectively switches the reading facility for the coding marks, is performed by pushing the bottle into this operating head.

In the case of the operating head according to the present invention, the drink liquids flow through a liquid channel of the operating head. In this case, it is expedient if the operating head has an injection gap through which a predetermined quantity of water can be injected into the liquid channel after metering. This means that the quantity of water can be adjustable as a function of the coding read so that, for example, for juices, a larger quantity of water is available for rinsing than for spirits.

It is advantageous for the injection gap to conically narrow axially in the flow direction, and, at the peripheral walls of the liquid channel, to open annularly into the liquid channel. Such a structure results in the avoidance of spraying of the water upwardly, in other words in the direction of the receiving opening.

The invention is explained in more detail below with reference to an exemplary embodiment illustrated in the drawing.

The drawing illustrates a stationary operating head 1, which has a screwed-on outflow spout 2 on its underside. The outflow spout 2 is screwed onto a connecting piece 3 and is an extension of a liquid channel 4 running longitudinally through the operating head 1. In the lower region of the operating head 1, the liquid channel 4 is surrounded by a flowmeter 5, which has an induction coil 6, diagrammatically illustrated. Leads 7 run from the induction coil 6 to a measuring amplifier 8. The measuring amplifier 8 amplifies and processes the signal measured by the induction coil 6.

Above the flowmeter 5, and connected to the latter via a screw thread, is a receiving part 9. The receiving part 9 has a receiving opening 10 for the head of a bottle onto which a housing of a solenoid valve (not shown) is attached. The housing includes a series of coding rings. Corresponding to the possible coding rings, five annular reading coils 11, which recognize the coding, are arranged in the receiving part 9. Around the reading coils 11 is wound an operating coil 12 which serves to operate the solenoid valve of the bottle. The receiving part 9 has an upper flange 13 which is formed in two parts by an upper part 14 and a lower part 15. An upwardly-opening gap 16, to which a water supply (not shown) is connected, extends between upper part 14 and lower part 15. The gap 16 conically narrows in the axial direction downwardly and, in the upper region of the receiving opening 10, opens out annularly into the walls of the receiving opening 10, which are an upward extension of the liquid channel 4.

After each removal of a bottle from the receiving opening 10, a predetermined quantity of water is automatically injected through the gap 16 into the receiving opening 10 and the liquid channel 4, so that the latter is rinsed and freed from remains of the bottle fluid.

It goes without saying that it is possible with the stationary operating head 1 to perform multiple metering operations, i.e., to fill a number of glasses one after the other with the same drink. In this case, rinsing is, of course, not carried out until the glasses have been filled, i.e., the bottle is taken out of the receiving opening 10.

It is expedient if a liquid drain for the rinsing water is provided beneath the stationary operating head 1.

It has been shown in practice that the possibility of dispensing drinks at various places within an area of limited movement does not offer any substantial advantages. Even in bar work, the customer is only interested in seeing the original bottle and recognizing that his drink is filled from the original bottle. With the device according to the present invention, a universal dispensing station is now available via which all drinks served by a restaurant can be metered and billed.

It goes without saying that recognition of the coding does not have to be performed with the aid of coding rings and corresponding reading coils 11. It is similarly conceivable to use an optically scannable pattern as coding. The respective coding used enables the flowmeter 5 to receive information on which quantity is to be dispensed.

It is advantageous if, beneath the outflow spout 2, a sensor 17 for a glass placed under the outflow spout 2 is provided. The sensor can effect the opening of the operating coil 12. Alternatively, the operating coil 12 may open when the sensor has reported a glass placed underneath, and subsequently the bottle is pushed into the receiving opening.

The sensor 17 may be designed mechanically or, preferably, as a light barrier. As the light barrier reacts to the edge of the glass, a delayed reaction of the operating coil 12 to the signal of the light barrier will be expedient. In the case of multiple metering operations, the sensor 17 may also terminate the opening time of the operating coil 12.

The flowmeter is preferably designed as a magnetically inductive flowmeter, because such a flowmeter can be constructed to be very small, thus allowing for a compact form of the operating head 1 and very close positioning to the flowing liquid so that there is a very small dead volume. The registration of the dispensed liquid is controlled by the flowmeter, or at least is influenced by the flowmeter, so that in the event that liquid does not flow from the bottle due to jamming or a similar defect of the solenoid valve, even though the operating coil 12 is actuated to open the solenoid valve, no registration is performed.

I claim:

1. A device for the metered dispensation and registration of liquids from a bottle, comprising:
   (a) a solenoid valve attachable to the neck of a bottle and magnetically operable between an opened position and a closed, rest position, said valve comprising a housing which includes coded information;
   (b) a fixedly-installed operating head which comprises
      (i) a receiving part which includes:
         a receiving opening extending substantially vertically for receiving the bottle with said solenoid valve,
         a coil about the receiving opening for operating said solenoid valve,
         a reading facility for reading said coded information,
         an injection opening for injecting a predetermined quantity of rinsing fluid into said liquid channel after metering, said injection opening being located in the region of said operating head near the said bottle receiving opening,
      (ii) a flowmeter connected to said receiving part, said flowmeter being disposed downstream of said solenoid valve for controlling the opening time of said solenoid valve in response to passage of a predetermined quantity of liquid, and
      (iii) a liquid channel extending longitudinally through said receiving part and said flowmeter; and
   (c) a stationary registration facility connected to said operating head.

2. A device as claimed in claim 1, wherein said injection gap conically narrows axially in the flow direction and opens annularly at the peripheral walls of said liquid channel.

3. A device as claimed in claim 1, further comprising a sensor positioned beneath said operating head and operatively connected to said operating coil.

4. A device as claimed in claim 3, wherein said sensor comprises a light sensor.

5. A device as claimed in claim 1, wherein said reading facility comprises a reading coil.

6. A device as claimed in claim 1, wherein said reading facility comprises means for optically scanning said coded information.

7. A device as claimed in claim 1, wherein said flowmeter comprises an induction flowmeter.

8. A device as claimed in claim 1, which employs only a single valve.

9. A device for the metered dispensation and registration of liquids from a bottle, comprising:
   (a) a solenoid valve attachable to the neck of a bottle and magnetically operable between an opened position and a closed, rest position, said valve comprising a housing which included coded information;
   (b) a fixedly-installed operating head which comprises
      (i) a receiving part which includes:
         a receving opening extending substantially vertically for receiving the bottle with said solenoid valve,
         a coil about the receiving opening for operating said solenoid valve,
         a reading facility for reading said coded information,
         an injection opening for injecting a predetermined quantity of rinsing fluid into said liquid channel after metering, said injection opening being located in the region of said operating head near the said bottle receiving opening, and
      (ii) a liquid channel extending longitudinally through said receiving part;
   (c) a stationary registration facility connected to said operating head; and
   (d) means, including an induction flowmeter connected to said receiving part and surrounding said liquid channel, for dispensing a plurality of different predetermined quantities of liquid through said solenoid valve, irrespective of liquid viscosity, by controlling the opening time of said solenoid valve in response to passage of a predetermined quantity of liquid through said solenoid valve as measured by said flowmeter.

* * * * *